United States Patent [19]
Richardson et al.

[11] Patent Number: 5,542,515
[45] Date of Patent: Aug. 6, 1996

[54] DEVICE FOR CONTROLLING A PART-TIME DRIVE AXLE FOR A MOTOR VEHICLE

[75] Inventors: John A. Richardson, Windsor, Canada; Dean L. Nicopolis, Northville, Mich.

[73] Assignee: Ford Motor Company, Dearborn, Mich.

[21] Appl. No.: 225,106

[22] Filed: Apr. 8, 1994

[51] Int. Cl.$^6$ ................................ F16D 41/064
[52] U.S. Cl. ................................ 192/44; 192/50
[58] Field of Search .................. 192/50, 48.92, 192/44, 38; 180/245

[56] References Cited

U.S. PATENT DOCUMENTS

| | | | |
|---|---|---|---|
| 836,035 | 11/1906 | Hendricks | 192/50 |
| 4,341,281 | 7/1982 | Nagy . | |
| 4,620,621 | 11/1986 | Kulczycki et al. | 192/44 X |
| 5,195,604 | 3/1993 | Brockett et al. . | |

FOREIGN PATENT DOCUMENTS

| 1259151 | 1/1968 | Germany | 192/48.92 |
|---|---|---|---|

OTHER PUBLICATIONS

USSN 08/071,884, filed Jun. 7, 1993, "All–Wheel Drive Free–Wheel Mechanism for a Motor Vehicle", John H. Tanzer, inventor.

Primary Examiner—Richard M. Lorence
Attorney, Agent, or Firm—Frank G. McKenzie

[57] ABSTRACT

An automatic spindle engager for a part-time axle of a four-wheel drive motor vehicle includes a wheel spindle that carries a wheel, an outer drive member, inner drive member drivably connected to an engine through an axleshaft, a set of drive rollers and clutch surfaces for drivably connecting the outer member and inner member, a set of spring loaded trigger rollers and inclined clutch surfaces on which the rollers are held, and a retainer movable with the changing position of the trigger rollers for transmitting movement of the trigger rollers to the set of drive rollers. Pairs of inclined clutch surfaces form detents in which the drive rollers are located when no torque is transmitted through the mechanism. The drive rollers move on their inclined clutch surfaces in accordance with movement of the retainer. This drivably connects a road wheel and the driven axle only when torque is transmitted in either direction from the engine to the wheels and from the wheels to the engine.

12 Claims, 3 Drawing Sheets

DEVICE FOR CONTROLLING A PART–TIME DRIVE AXLE FOR A MOTOR VEHICLE

BACKGROUND OF THE INVENTION

1. Field of the Invention

This invention relates to the field of four-wheel drive systems for motor vehicles. More particularly, the invention pertains to a device for drivably connecting an axle shaft and the wheels of a motor vehicle 2. Description of the Prior Art The powertrain for a part-time, four-wheel drive motor vehicle includes a transfer case driven from an engine through a multiple-speed transmission. The transfer case includes a first output shaft continuously connected to a first set of drive wheels through an axle differential and two axleshafts driven from the differential output. The transfer case includes a second output that drives a second axle differential mechanism or disconnects the transfer case input from the second differential mechanism, depending on the engaged and disengaged state of a clutch located in the transfer case.

When operating in two-wheel drive mode, the set of drive wheels that is then disengaged from the transmission output shaft has no drive connection to the components of the powertrain located between the nondriven wheels and the engine. To provide this drive connection in a conventional powertrain, the wheels of the axle that are driven from the transfer case only in four-wheel drive mode are equipped with hub locks, which alternately connect and release the wheels and the axleshafts that are driven from the associated differential mechanism. Hub locks are usually engaged manually or can be engaged automatically, provided a suitable power source and actuation mechanism are available.

U.S. Pat. No. 4,341,281 describes another solution to the problem, in which only one of the split axles of the part-time axle assembly is disconnected from the output of the corresponding differential mechanism, usually one of the side double gears of an epicyclic differential mechanism. To produce this effect, an actuator, such as a vacuum motor or solenoid, moves a sliding coupler along the axleshaft in opposite axial directions alternately to engage and disengage a connection between a side bevel gear of the differential mechanism and the axleshaft. However, when a vacuum motor or solenoid is used in a driveline, it requires control logic, an electronic system usually in the form of a microprocessor for processing the logic, electronic memory for storing the logic, various sensors, and conditioning circuitry, and a power source to produce the desired connection and disconnection between the engine and part-time drive axle. An external source of power, such as a connection to the engine intake manifold in the case of a vacuum-actuated motor, or an electrical power supply in the case of a solenoid, is required. Systems of this kind involve substantial cost in providing the microprocessor and control logic, and additional complexity and cost in manufacturing and assembly, It is desirable to minimize the cost and complexity of these items in a driveline that can be activated when four-wheel drive operation is desired and deactivated for two-wheel drive operation, provided these functions can occur automatically and reliably.

SUMMARY OF THE INVENTION

It is an object of this invention to provide a part-time drive axle for a four-wheel drive motor vehicle that produces a drive connection between the wheels of a part-time axle and the engine of the motor vehicle, both when power is transmitted from the engine to the wheels and when power is transmitted from the wheels to the engine.

It is another object of this invention to provide a part-time, four-wheel drive system that will operate automatically and reliably, and can be produced at low cost and minimal complexity.

In realizing these objectives, an automatic spindle device for the axle that is driven only part-time in a four-wheel drive powertrain includes first and second members supported for rotation, a first coupling located between the first member and second member for engaging a drive connection therebetween when power is transmitted in a first directional sense from the first member to the second member, and a second coupling arranged in parallel with the first coupling for engaging a similar drive connection as that of the first coupling when power is transmitted in a second directional sense from the second member to the first member. The device may include a trigger mechanism for alternately urging engagement of one of the first coupling and second coupling, and urging disengagement of the other of the first coupling and second coupling depending on the directional sense of power transmission.

The device, which drivably connects an axleshaft and a wheel adapted to support the vehicle, further includes a first member having an axis about which it rotates, formed with pairs of first and second surfaces, the surfaces of each pair inclined for at least potential mutual intersection, the pairs being spaced mutually about said axis, the surfaces of each pair extending radially and in opposite angular directions from said intersection. A second member, coaxial with the first member, defines a surface facing the inclined surfaces of the first member. Drive rollers are mutually spaced about the axis, each roller located for contact with the surfaces of each pair of surfaces and for contact with the surface of the second member. Springs resiliently urge each drive roller into contact with an associated pair of inclined surfaces. A first set of springs in the trigger mechanism resiliently urge the drive rollers toward the first surface of each pair and away from the second surface of each pair; and a second set of springs in the trigger mechanism resiliently urge the drive rollers toward the second surface of each pair and away from the first surface of each pair.

DESCRIPTION OF THE PREFERRED EMBODIMENT

Figure 1:
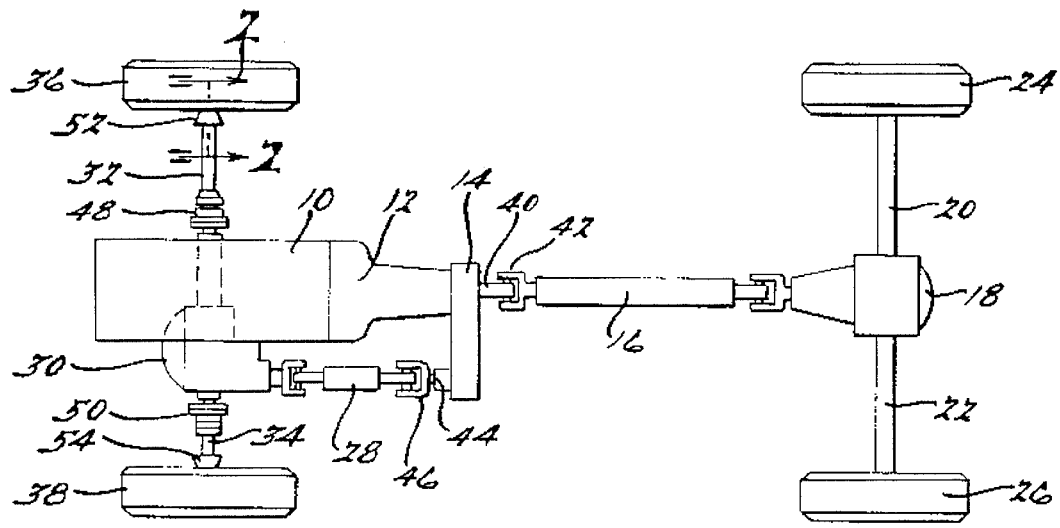
FIG. 1 a plan view of a powertrain for a four-wheel drive vehicle, to which the drive mechanism of the present invention can be applied.

Referring now to FIG. 1, the powertrain of a part-time, four-wheel drive motor vehicle includes an engine 10, transmission 12, transfer case 14, rear drive shaft 16, rear differential 18, right-hand and left-hand rear axleshafts 20, 22, rear drive wheels 24, 26, front drive shaft 28, front axle differential 30, right-hand and left-hand front axleshafts 32, 34, and front drive wheels 36, 38.

The transfer case transmits power under normal operating conditions, i.e., in the two-wheel drive mode, to a rear output shaft 40, which is drivably connected through universal joint 42 to rear drive shaft 16. When four-wheel drive is required, the transfer case 14 directs power also to a front output shaft 44, which is drivably connected by universal joint 46 to front drive shaft 28. Rear drive shaft 16 is drivably connected by the epicyclic differential mechanism 18, which transmits power to the rear drive wheels 24, 26 and permits those wheels to turn at mutually different speeds. Front drive shaft 28 is drivably connected by epicycle differential mechanism 30, which transmits power to the front drive wheels 36, 38 and permits those wheels to turn at mutually different speeds.

Plunging constant velocity joints 48, 50, located at the inboard ends of the front halfshafts 32, 34, drivably connect the output of differential 30 to the halfshafts, which extend outboard from opposite lateral sides of the front differential mechanism 30. Fixed or nonplunging constant velocity joints 52, 54 are located at the outboard ends of halfshaft assemblies 32, 34. Alternatively, a Cardan universal joint may replace the outboard constant velocity joints 52, 54. In either case, a wheel spindle-axle mechanism of the present invention (described below) is located between the wheel 36, 38 and outer joint 52 or 54 at the outboard end of each halfshaft 32, 34. However, only the right-hand side device is described.

Figure 2:
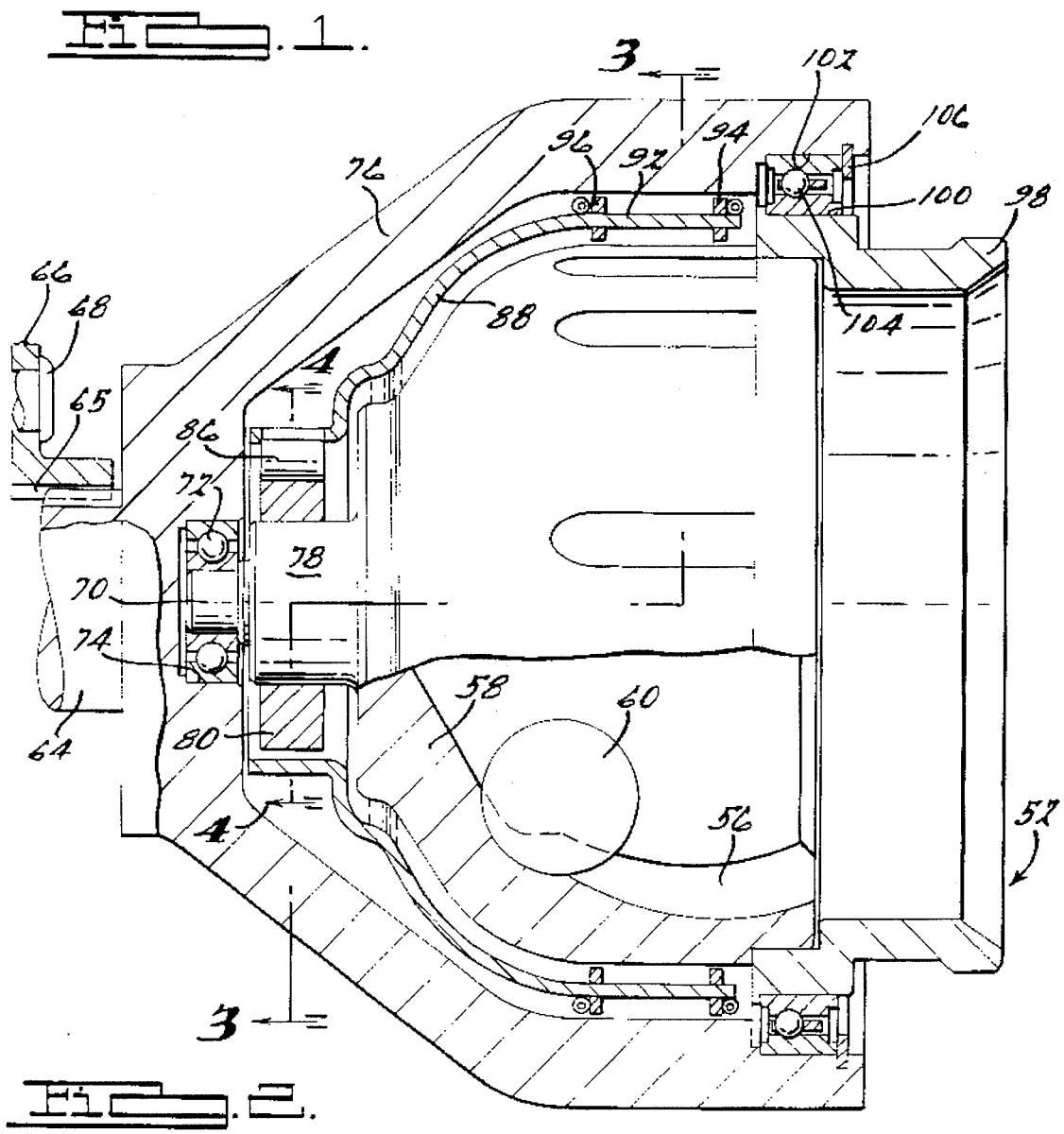
FIG. 2 is a cross section through the longitudinal centerline of a wheel spindle-axleshaft mechanism of the present invention taken at plane 2—2 of FIG. 1.

FIG. 2 shows an arcuate track 56, formed on the inner surface of inner drive member 58. Torque is transmitted from halfshaft 32 to the inner drive member 58, due to the engagement of balls 60 located in the tracks 56 and in corresponding tracks formed in the CV joint 52. The balls are spaced angularly at equal intervals about the longitudinal axis of the halfshaft assembly.

An outer drive member 76 is formed integrally with a wheel spindle 64, connected by a spline 65 to a wheel hub 66, which supports a set of wheel studs 68, also spaced at equal angular intervals about the axis of the axle and wheel spindle. Wheel 36 is mechanically connected to the wheel hub by threading hub nuts on the threaded shank of the hub bolts 68.

The axially inner end of the inner drive member 58 carries a stem 70, which is supported rotatably on an outer ball bearing 72 located in a recess 74 formed on an inner surface of the outer drive member 76. Drive member 58 is formed with a cylindrical shoulder 78, surrounded by or formed integrally with a trigger hub 80, upon which are formed four clutch surfaces 82, 83, 84, 85. Each of these surfaces is contacted by a trigger roller 86, spaced mutually, angularly about the central axis by a roller retainer 88. Each of the trigger rollers 86 is biased by a compression spring 90 located in a space bounded by the inner surface of retainer 88 and clutching surfaces 82–85 formed on the outer surface of the trigger hub 80, as seen best in FIGS. 3 and 4.

Figure 5:
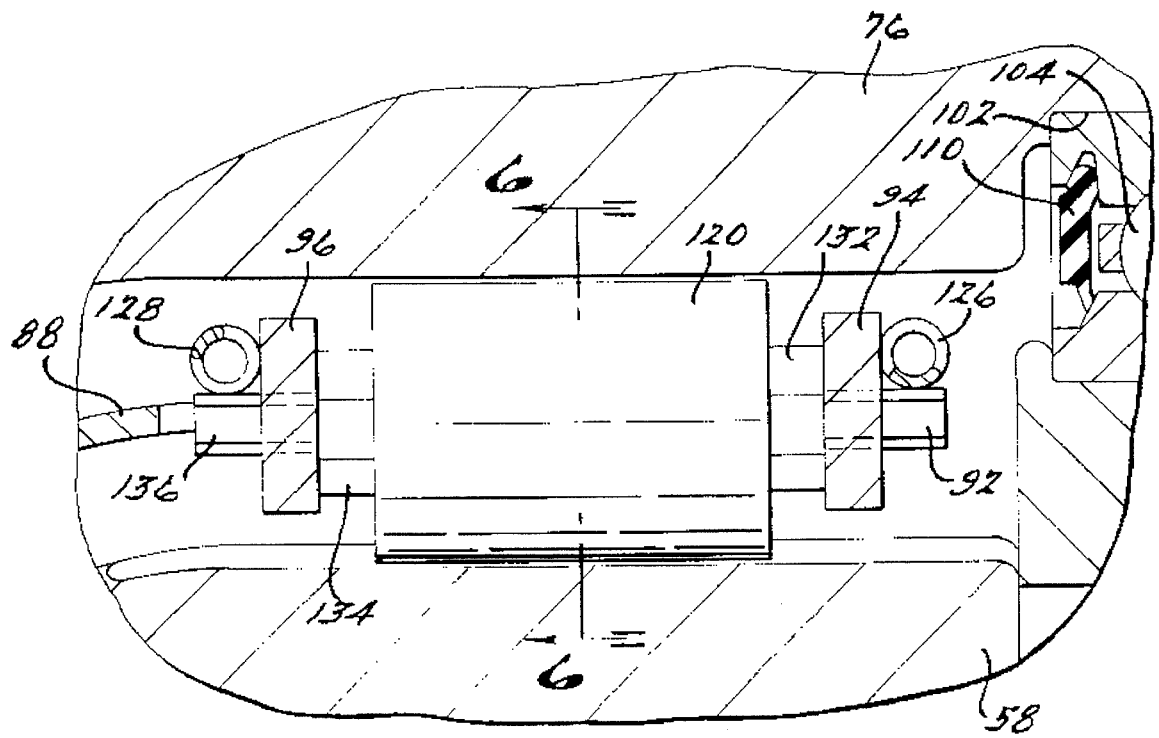
FIG. 5 is an enlarged detail of a drive roller, spring clips, trunnion rings, and trunnions view along the longitudinal axis.
Figure 6:
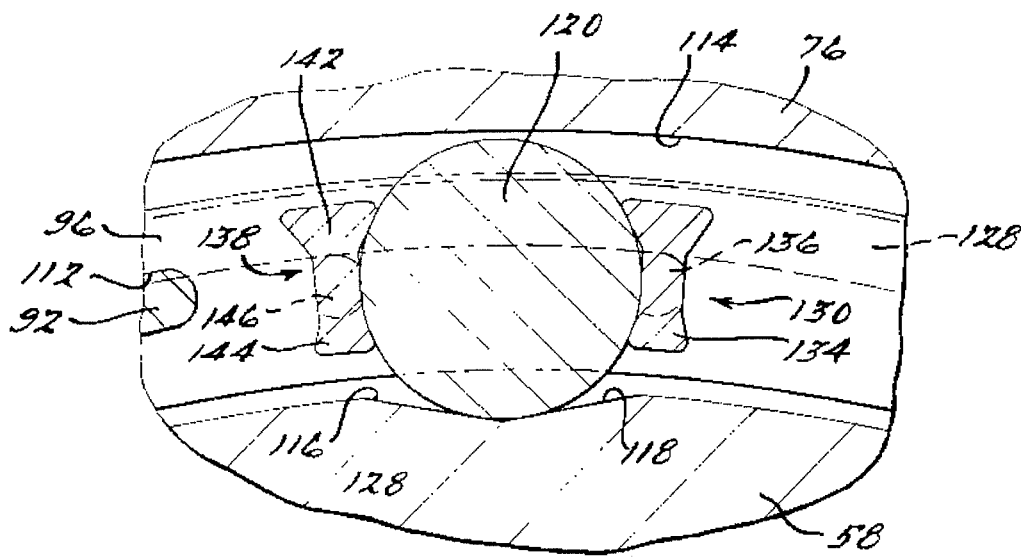
FIG. 6 is a cross section, taken at plane 6—6 of FIG. 5, showing the drive roller, spring clip, retainer, trunnion ring, and trunnions.

The inboard end of retainer 88 is formed with six axially directed, angularly spaced tabs 92, which fit within circumferentially directed slots formed on inner and outer axially spaced trunnion rings 94, 96. Tabs 92 are separated by axially extending recesses spaced angularly about the central axis. FIGS. 5 and 6 show these details in large scale.

Located adjacent the inboard end of inner drive member 58, or formed integrally with member 58, is an adapter 98 suited to support the end of a rubber boot that protects the constant velocity joint 52 against passage of contaminants. Adapter 98 is formed with a cylindrical outer surface 100 facing a corresponding cylindrical surface 102 formed on the inner surface of the outer drive member 76. An inner ball joint bearing 104 is located in the annular space between surfaces 100 and 102 and is held in place by a snap ring 106.

Referring now to FIG. 5, the antifriction elements of the bearing are spaced mutually by a bearing cage, and the axial ends of the bearing are protected against contaminants by dynamic seals 110.

The tabs 92, formed on the inboard end of retainer 88, are located within and extending through slots 112 formed on trunnion rings 94, 96. The inner surface 114 of outer drive member 76, located in the vicinity of trunnion rings 96 and 94, is a cylindrical surface. The outer surface of the inner drive member 58 is formed with inclined surfaces 116, 118, grouped in multiple pairs, each pair forming a recess into which is fitted a sprag or drive roller 120, preferably in the form of a right circular cylinder whose axis is directed substantially parallel to the longitudinal axis of the spindle engager. Drive rollers 120 and surfaces 116, 118 are located at angular intervals between tabs 92.

Figure 3:
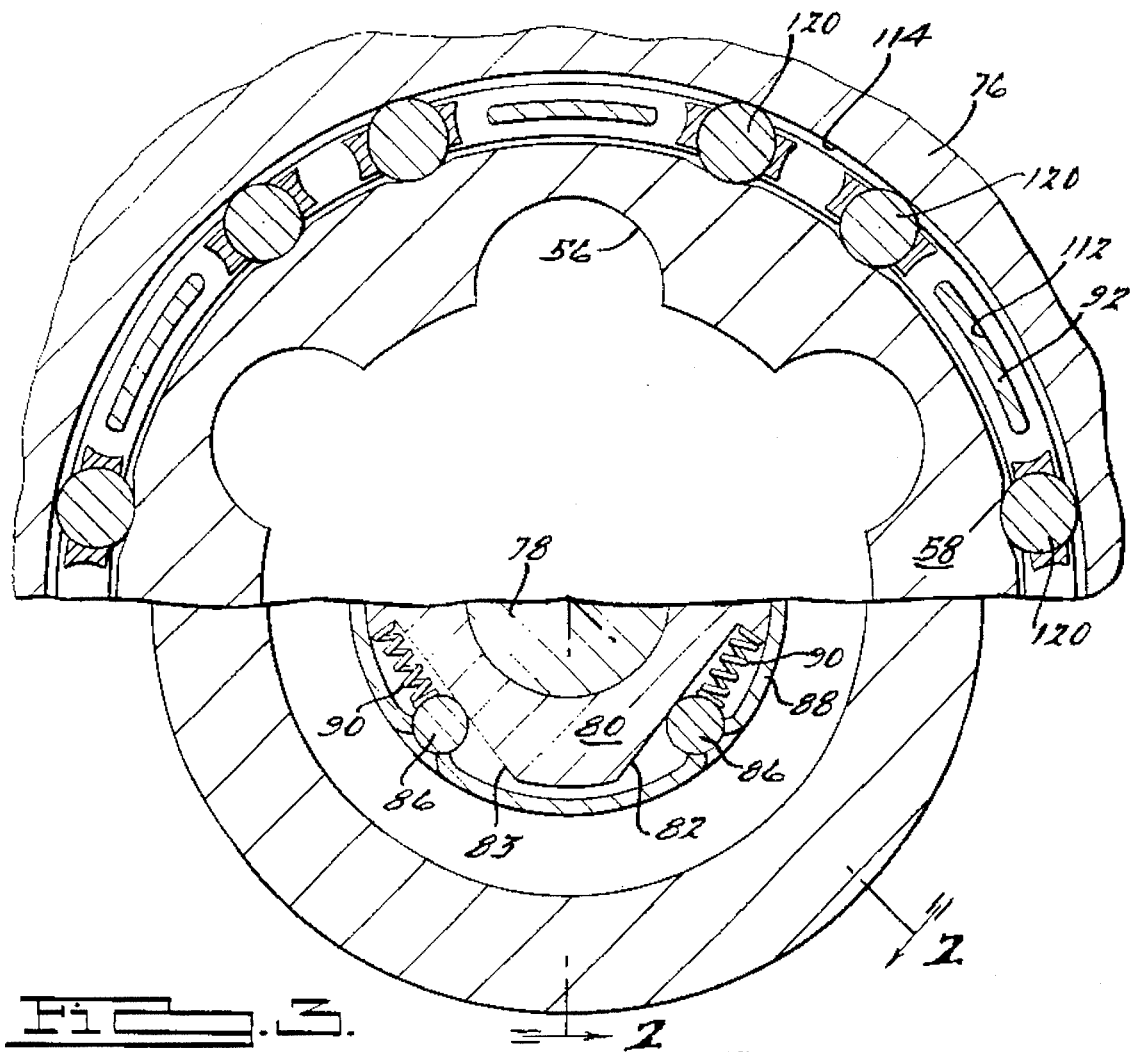
FIG. 3 is a cross section through the mechanism of FIG. 2 taken at plane 3—3.

The pairs of inclined surfaces 116, 118 are spaced mutually angularly about the axis. Pairs of drive rollers 120 and the associated inclined surface pair are grouped together in pairs, as seen in FIG. 3, each pair of rollers and inclined surfaces being spaced angularly about the axis of the spindle engager from other such pairs. The inclined surfaces 116, 118 are inclined preferably at an approximately 10° angle with respect to a tangent constructed from the cylindrical outer surface of the inner drive member 58 on which surfaces 116 and 118 are formed.

Refer now to FIGS. 5 and 6 where an assembly for continually biasing rollers 120 into contact with inclined surfaces 116, 118 is illustrated. Located on the inboard side of inner trunnion ring 94 is a garter spring 126. Similarly, located on the outboard side of the outer trunnion ring 96 is a garter spring 128.

Trunnion 130, extending axially along the lengths of rollers 120 and located at a first angular side of rollers 120, includes blocks 132, 134 located at radially inner and outer sides of a longitudinally directed rod 136 extending along the length of each roller 120. Blocks 132 and 134 are biased radially inward and held in contact with the roller by the action of garter springs 126, 128.

Similarly, located at the opposite side of roller 120, a second trunnion 138 includes radially outer block 142 and a radially inner block 144 supported on an axially extending rod 146. Blocks 142 and 144 are held in contact with roller 120 by garter springs 126, 128. The rollers 120 are held radially inward in contact with inclined surfaces 116, 118 to avoid inadvertent, self-engagement and self-disengagement of the spindle engager that might otherwise result due to vertically directed forces developed in the assembly due to impact of a wheel on rough road surfaces and other similar conditions.

A spindle engager, according to the present invention, is shown in a neutral position, i.e., with no torque transfer between the inner drive member 56 and outer drive member 76. In this condition, the engine is neither driving the wheels through the axle, halfshaft and CV joints, nor is the wheel driving the axle.

Trigger hub 80 is shown centered with respect to the inner and outer drive members 58, 76; compression springs 90 have forced the trigger rollers 86 to a position on the inclined ramps 82–85 such that the inner surface of the rollers is in contact with the associated inclined surface, and the rollers are in contact with radially inwardly directed tangs 150 formed on retainer 88 and located adjacent the trigger rollers 86.

In the neutral position, because of the centered position of trigger hub 80 and retainer 88, the outer drive rollers 120 are seated at the base of the detent or recess formed by the intersection of inclined surfaces 116, 118 on the outer surface of the inner drive member 58. In that position, the drive rollers 120 are out of contact, by a nominal running clearance of less than 0.500 mm, with the cylindrical surface 114 formed on the inner surface of the outer drive member 76.

Figure 4:
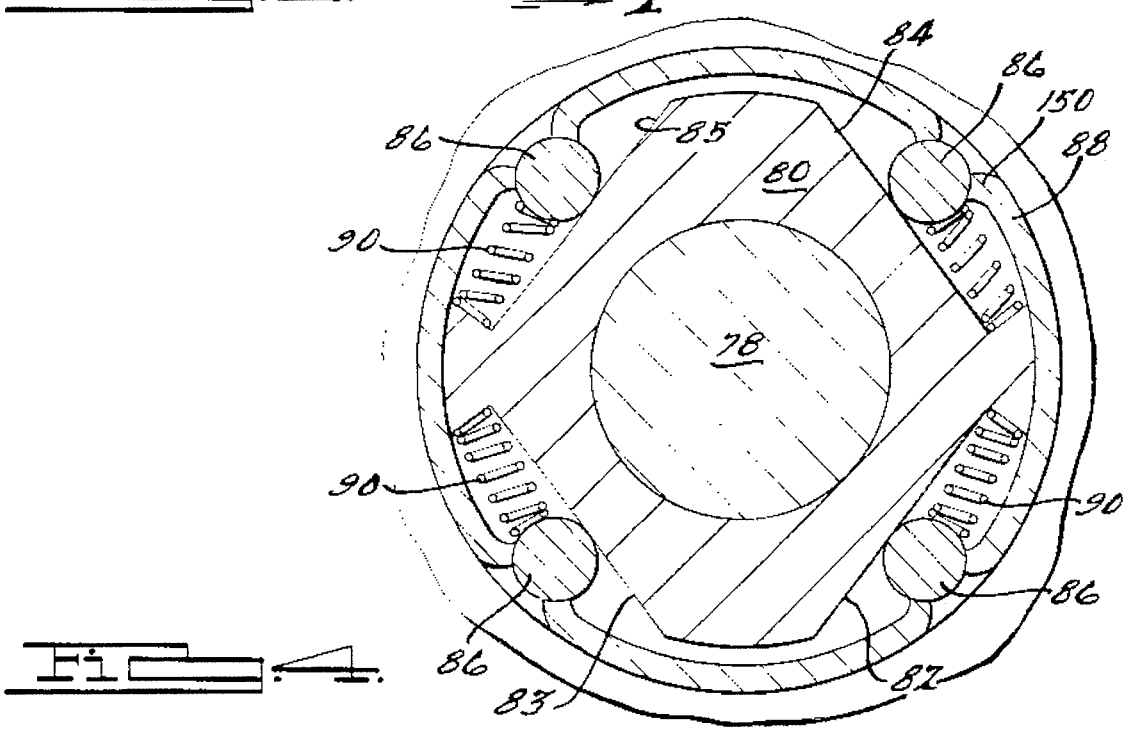
FIG. 4 is a cross section taken at plane 4—4 through a trigger hub, trigger roller, and retainer of the mechanism of FIG. 2.

When torque is transmitted from the engine 10, through transmission 12, transfer case 14, forward drive shaft 28, differential mechanism 30, and CV joints 48, 52 on halfshaft 32, trigger hub 80 rotates, e.g., counter, when viewed as in FIG. 4, about the axis of the axleshaft. This rotation causes two diametically opposite trigger rollers 86 to move on the inclined surfaces 82, 85 with the aid of springs 90, and the other two rollers 86 to move on surfaces 83, 84 against the effect of springs 90 adjacent those surfaces. This movement of hub 80, relative to rollers 86 and retainer 88, is transmitted by retainer 88 to trunnion rings 94, 96 as rollers 86 contact the tangs 150 on the retainer, and due to the location of the tabs 92 within the slots formed in the trunnion rings. As the trunnion rings rotate, drive rollers 120 move away from the detent position at the base of inclined surfaces 116, 118 and travel up incline surface 118, thereby forcing each drive roller 120 into engagement with cylindrical surface 114 on the inner surface of the outer drive member 76. When this occurs, engine torque is carried from halfshaft 32, inner member 58, rollers 120, outer drive member 76, wheel spindle 64, and spline 65 to the wheel hub 66, where it is transmitted by wheel studs 68 to the wheel 36 of the vehicle. Rollers 120 rotate approximately two degrees from the detent position of FIG. 6 to the point of contact on surface 114 of the outer member 76.

Whenever engine 10 stops driving the halfshafts and wheel 36 begins to drive halfshaft 32, such as while coasting, outer drive member 76 rotates about two degrees on surface 118 to the neutral position shown in FIGS. 3 and 6, and two degrees on surface 116 relative to trigger hub 80. When this occurs, drive rollers 120 move away from surface 114, down inclined surface 118, past the detent at the base of that surface, and up inclined surface 116 until rollers 120 again contact cylindrical surface 114 on the inner surface of the outer drive member 96, thereby restoring the direct drive connection between the wheel 36 (outer member 76) and halfshaft 32 (inner member 58). Retainer 88 transmits this relative displacement outboard to the trigger mechanism, thereby permitting those springs 90 that were compressed, when torque was transmitted from the engine 10 to the drive wheels 36, to expand, and causing the two springs 90 that were expanded, when torque was transmitted through the spindle engager from the engine to the drive wheels, to compress. This action, which occurs in the right-hand side and left-hand side spindle engagers at wheels 36, 38, drivably connects the wheels to the engine 10 so that engine braking is available during coast conditions or whenever the wheels drive the axleshafts. Potential energy stored in the compressed springs is released during a change of drive direction to aid movement of rollers 120 on surfaces 116, 118 and into engagement with surface 114.

When torque is transmitted from wheel 36 to halfshaft 32, the rollers 120 move from the neutral position of FIG. 6, up inclined ramps 116 to a position where each roller contacts the inner surface 114 of outer drive member 76. This movement, about 2° from the base of the detent, is transmitted by retainer 88 to trigger rollers 86, which are urged to rotate counterclockwise relative to hub 80 on surfaces 83, 84 with the aid of springs 90 and on surfaces 82, 85 against the force of the springs adjacent those surfaces. When the trigger hub 80 rotates counterclockwise, as viewed in FIG. 4, before engagement of the outer drive roller, movement of trigger rollers 86 on surfaces 83, 84 causes springs 90 near those surfaces to extend, and trigger roller movement on inclined surfaces 82, 85 causes springs 90 near those surfaces to compress.

Having described a preferred embodiment of our invention, what we claim and desire to secure by U.S. Letters Patent is:

1. A mechanism for transmitting power, comprising:

a first member supported for rotation about an axis, defining pairs of inclined surfaces spaced mutually angularly about said axis, having clutch surfaces spaced angularly about said axis, a trigger roller contacting each clutch surface, spring means urging each trigger roller to move in a first direction on the corresponding clutch surface and to resist said movement in a second direction opposite the first direction;

a second member supported for rotation about said axis, defining a surface surrounding the inclined surfaces;

a roller retainer adapted to rotate about said axis responsive to rotation of one of the first and second members with respect to the other of said first and second members;

first and second mutually spaced trunnion rings surrounding the inclined surfaces and moveable angularly about said axis with the roller retained;

drive rollers located for contact with the inclined surfaces and located between the first and second trunnion rings, supported rotatably on the trunnion rings, rotation of one of the first and second members relative to the other of said first and second members causing the drive rollers to ascend a corresponding inclined surfaces, thereby to engage driveably the drive rollers with the surface of the second member and an inclined surface of the first member.

2. The mechanism of claim 1, further comprising:

second spring means for urging the drive rollers toward contact with the inclined surfaces.

3. The mechanism of claim 1, wherein the roller retainer maintains the angular position of each trigger roller with respect to other trigger rollers and maintains contact of each trigger roller with the corresponding clutch surface, the trunnion rings define mutually aligned slots therein, a portion of the roller retainer located in said slots.

4. The mechanism of claim 1, wherein the first member defines first and second clutch surfaces spaced mutually diametrically opposite, and third and fourth clutch surfaces spaced mutually diametrically opposite and spaced about said axis from the first and second clutch surfaces, the spring means comprising first and second springs, each said spring urging a trigger roller to move in a first direction about said axis on the corresponding clutch surface and resisting said movement in a direction opposite the first direction; and third and fourth springs, each said spring urging a trigger roller to move in a second direction about said axis on the corresponding clutch surface and resisting said movement in a direction opposite the first direction.

5. The mechanism of claims 4, further comprising:

second spring means for urging the drive rollers toward contact with the inclined surfaces.

6. The mechanism of claim 4, wherein the roller retainer maintains the angular position of each trigger roller with respect to other trigger rollers and maintains contact of each trigger roller with the corresponding clutch surface, the trunnion rings define mutually aligned slots therein, a portion of the roller retainer located in said slots.

7. In a motor vehicle, a device for engaging and disengaging a drive connection between an axleshaft adapted to transmit power to or from a wheel adapted to support the vehicle, comprising:

a first member supported for rotation about an axis, defining pairs of inclined surfaces spaced mutually angularly about said axis, having clutch surfaces spaced angularly about said axis, a trigger roller contacting each clutch surface, spring means urging each trigger roller to move in a first direction on the corresponding clutch surface and to resist said movement in a second direction opposite the first direction;

a second member supported for rotation about said axis, defining a surface surrounding the inclined surfaces;

a roller retainer adapted to rotate about said axis responsive to rotation of one of the first and second members with respect to the other of said first and second members;

first and second mutually spaced trunnion rings surrounding the inclined surfaces and moveable angularly about said axis with the roller retained;

drive rollers located for contact with the inclined surfaces and located between the first and second trunnion rings, supported rotatably on the trunnion rings, rotation of one of the first and second members relative to the other of said first and second members causing the drive rollers to ascend a corresponding inclined surfaces, thereby to engage driveably the drive rollers with the surface of the second member and an inclined surface of the first member.

8. The mechanism of claim 7, further comprising:

second spring means for urging the drive rollers toward contact with the inclined surfaces.

9. The mechanism of claim 7, wherein the roller retainer maintains the angular position of each trigger roller with respect to other trigger rollers and maintains contact of each trigger roller with the corresponding clutch surface, the trunnion rings define mutually aligned slots therein, a portion of the roller retainer located in said slots.

10. The mechanism of claim 7, wherein the first member defines first and second clutch surfaces spaced mutually diametrically opposite, and third and fourth clutch surfaces spaced mutually diametrically opposite and spaced about said axis from the first and second clutch surfaces, the spring means comprising first and second springs, each said spring urging a trigger roller to move in a first direction about said axis on the corresponding clutch surface and resisting said movement in a direction opposite the first direction; and third and fourth springs, each said spring urging a trigger roller to move in a second direction about said axis on the corresponding clutch surface and resisting said movement in a direction opposite the first direction.

11. The mechanism of claim 7, further comprising:

second spring means for urging the drive rollers toward contact with the inclined surfaces.

12. The mechanism of claim 7, wherein the roller retainer maintains the angular position of each trigger roller with respect to other trigger rollers and maintains contact of each trigger roller with the corresponding clutch surface, the trunnion rings define mutually aligned slots therein, a portion of the roller retainer located in said slots.

* * * * *